Dec. 18, 1945.  P. H. MITCHELL  2,391,067
METHOD AND APPARATUS FOR THE PRODUCTION OF CARBON BLACK
Filed Jan. 8, 1942  2 Sheets-Sheet 1
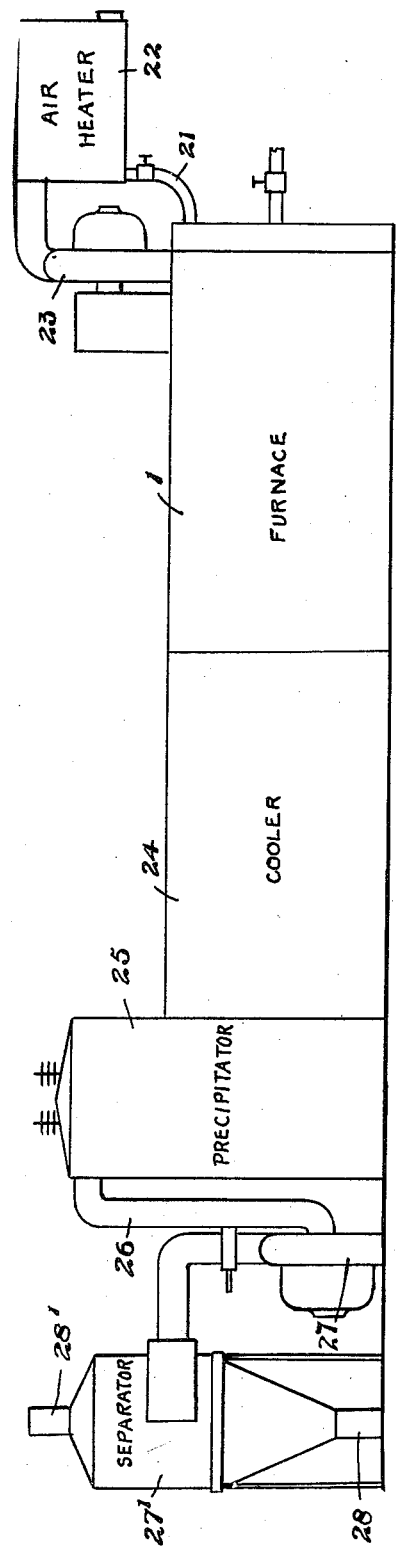
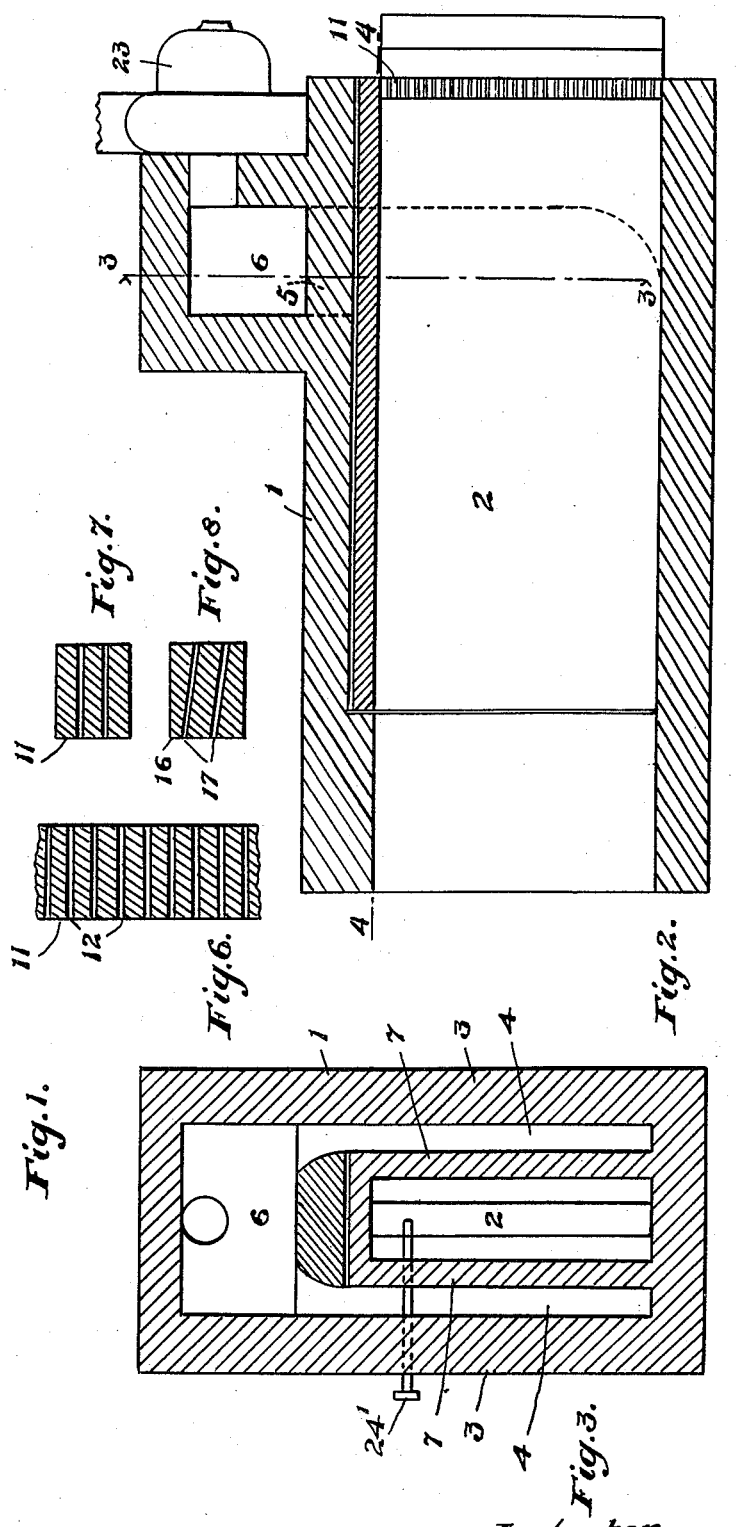
Inventor.
P. H. Mitchell
by H. J. S. Dennison
atty.

Dec. 18, 1945.  P. H. MITCHELL  2,391,067
METHOD AND APPARATUS FOR THE PRODUCTION OF CARBON BLACK
Filed Jan. 8, 1942  2 Sheets-Sheet 2

Inventor.
P. H. Mitchell
by H. S. Dennison
atty.

Patented Dec. 18, 1945

2,391,067

UNITED STATES PATENT OFFICE 2,391,067

METHOD AND APPARATUS FOR THE PRODUCTION OF CARBON BLACK

Percival H. Mitchell, Toronto, Ontario, Canada, assignor to Albert Carson Ransom, Toronto, Ontario, Canada Application January 8, 1942, Serial No. 425,977

12 Claims. (Cl. 23—209.8)

The principal objects of this invention are to produce by dissociation from gaseous or vaporous hydrocarbons a high percentage yield of a desirable quality of a soft carbon black desirable for use in the manufacture of printing ink and in the compounding of rubber and to provide an apparatus which may be accurately regulated to obtain the maximum production of the desired product at moderate cost and in which the quality of the carbon produced will be maintained at a uniform standard.

The principal feature of the invention consists in directing a flow of gaseous or vaporous hydrocarbon between high temperature combustion zones to effect the maximum decomposition of the hydrocarbon in forming carbon black and to prevent contact of the material being decomposed with the furnace walls, and further, to utilize the heat produced in the combustion zones in providing and maintaining boundaries for said combustion zones emanating radiant heat to assist in the dissociation action upon the stream of gaseous or vaporous hydrocarbon embraced by said heat zones.

A further important feature of the invention consists in the provision of means for separating the central flow of the hydrocarbon undergoing dissociation from products of combustion of the combustion zones at either side thereof and directing the products of combustion so separated into paths or zones to effect a heat exchange to walls confining said combustion zones and to direct the radiant energy absorbed therefrom to amplify the heat applied in the dissociation process.

In the accompanying drawings Figure 1 is a diagrammatic illustration of an apparatus constructed in accordance with the present invention to carry out the novel process.

Figure 2 is an enlarged vertical mid-sectional view through the furnace portion of the structure illustrated in Figure 1.

Figure 3 is a vertical cross section through the furnace taken on the line 3—3 of Figure 2.

Figure 6 is an enlarged sectional detail of a portion of one of the nozzle bars for directing air or gas into the furnace.

Figure 7 is a cross sectional view through one of the nozzle bars.

Figure 8 is a cross section through one of the nozzle bars for directing hydrocarbon into the combustion zone of the furnace.

Figure 4:
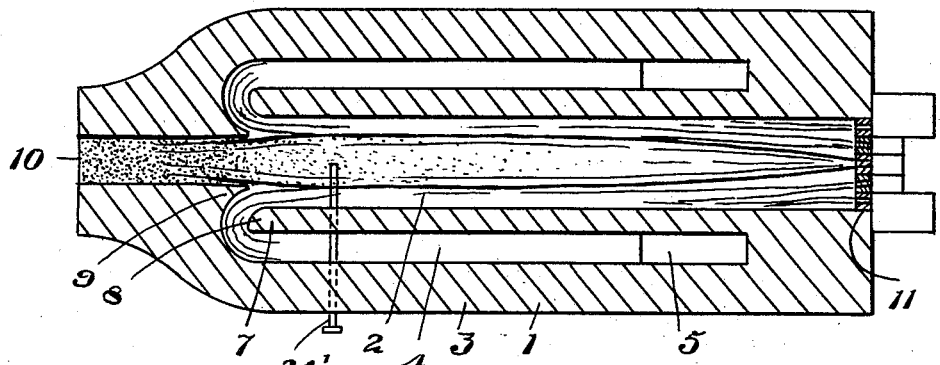
Figure 4 is a horizontal sectional view taken through the line 4—4 of Figure 2.

Carbon black is a commercial commodity required in various industries in extremely large quantities and it is found in practise that the product produced by heat of dissociation varies considerably.

This invention has been demonstrated to have produced a densely black soft carbon and it is found that the apparatus devised can be controlled so that the yield of carbon of the desired quality is high.

On reference to the accompanying drawings, the furnace 1 is here shown as of a horizontal type and is of generally rectangular form but preferably long and narrow and extending longitudinally thereof and in a vertical plane is a rectangular chamber 2. At either side of the chamber 2 the side walls 3 are formed with longitudinal passages 4 which lead to passages 5 at one end communicating with a flue chamber 6 arranged above the top of the furnace adjacent to its front end.

The partition wall 7 between the central chamber 4 and the side chambers 4 is preferably formed of refractory brick and the back ends 8 of these are rounded. The outward walls of the passages 4 are curved inwardly and spaced from the rounded ends 8 of the partition 7 a distance substantially equal to the width of the passages 4 and said inwardly rounded walls extend into the chamber 2 and past the outer walls thereof, forming projecting lips 9 arranged either side of a central passage 10 which forms the exit for the hydrocarbon gases or vapour that has been subject to dissociation within the main chamber 2.

Figure 5:
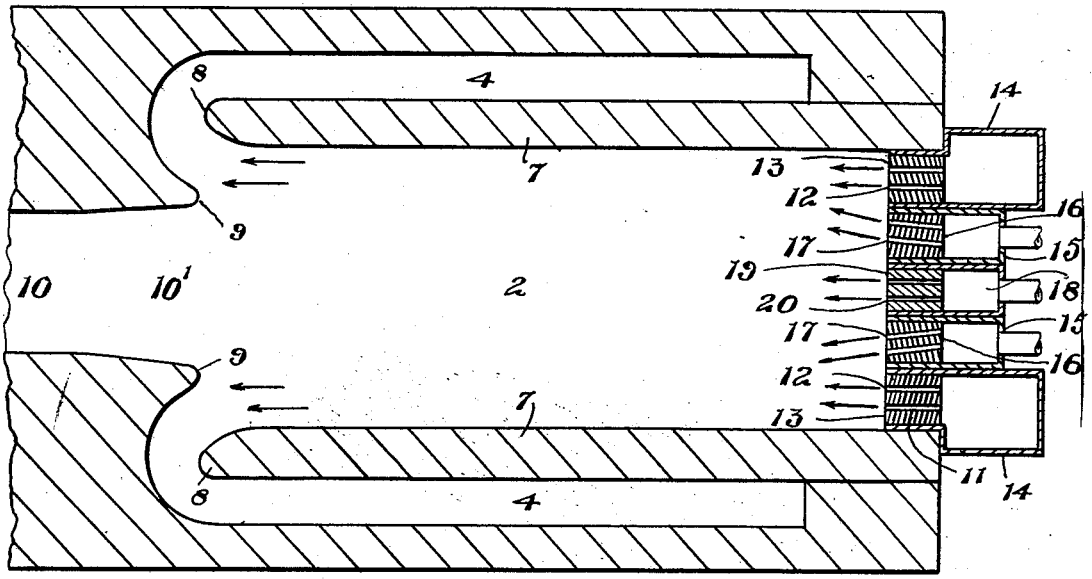
Figure 5 is an enlarged horizontal section through the furnace structure.

At the end of the furnace opposite the exit opening 10 there is arranged a plurality of nozzles. These nozzles are preferably in the form of bars 11 of rectangular cross section preferably of suitable steel or refractory material which are perforated by a plurality of horizontal holes 12 which are preferably equally spaced throughout the length of the bar and extend from the outward to the inward side. The outer pair of bars 13, as shown in detail in Figure 5, have the nozzle orifices 12 arranged in parallel pairs and the said orifices are substantially parallel to the inner side walls of the furnace chamber 2.

Each of the bars 13 is installed in one side of a vertical casing 14 which forms an air chest and air directed into this chest flows the full length of the height of the furnace and enters the chamber 2 through the multiplicity of air nozzles and a plurality of streams of air are projected into the furnace parallel with the inner walls thereof.

Adjacent to the casings 14 and on the inward side of each is arranged a pair of casings 15 which also extend vertically the full length of the furnace and at the inner sides of these casings are arranged the nozzle bars 16 which are perforated with a multiplicity of nozzle openings 17. These openings are horizontally arranged but are angled slightly outward and they project jets of gaseous fuel angularly outward toward the inner side walls of the furnace to mingle with the air projected through the nozzles of the bars 13.

Each of the casings 15 is connected with a suitable gaseous or vaporous fuel supply. Centrally between the casings 15 is arranged a casing 18 which is connected with a suitable supply of gaseous or vaporous hydrocarbon capable of being acted upon by heat to dissociate its elements and form carbon black.

A nozzle bar 19 is arranged at the inward side of the casing 18 and it is perforated with nozzle openings 20 arranged horizontally and spaced substantially equidistant throughout the length of the bar, said nozzle openings being adapted to project jets of the gaseous or vaporous hydrocarbon axially into the furnace chamber 2 in a centralized vertical plane.

The supply conduits leading to the nozzle casings 15 and 18 are provided with suitable control valves. The air supply casings 14 leading to the air nozzles are connected by conduits 21 controlled by suitable valves with an air heater 22 which is heated by the products of combustion drawn from the flue passages 5 and 6 connected with the passages 4 by means of a suitable exhaust fan 23.

In the operation of a furnace such as described a supply of gaseous or vaporous fuel is directed into the furnace chamber 2 through the nozzle bars 16 which, as has been explained, are angularly directed outwardly towards the inner walls of the furnace chamber 2. Concurrently with directing this combustible gas supply into the furnace chamber a desired quantity of air is directed through the nozzle openings 13, the air and gaseous or vaporous fuel mixing to form a combustible mixture and they are suitably ignited.

The exhaust fan connected with the flue passages 6, 5 and 4, create a definite circulation along the inner walls of the furnace and out through the passages 4. The heat of the burning fuel and air is imparted to the dividing walls 7 between the chamber 2 and the passages 4 and the heat of combustion flowing around the outward side of these dividing walls raises these walls to a state of incandescence. The outer walls of course absorb a certain quantity of heat but they may be suitably insulated or formed of refractory and insulating material so as to prevent the unnecessary escape of heat.

When the furnace has been raised to a predetermined temperature a supply of gaseous or vaporous hydrocarbon is directed in a vertical sheet into the axial zone of the furnace through the nozzle openings 20 in the bar 19.

The admixture of the heating fuel directed through the nozzles 17 and the air directed through the nozzles 13 is continued and the establishment of a direct draught along the inner walls of the furnace to and around the ends of the partition walls 7 and into the passages 4, maintains on either side of the furnace a distinct heating zone of combustion. The hydrocarbons projected into the central zone between these two combustion heating zones is not mixed with air and is therefore practically of an incombustible nature but this central stratum of hydrocarbon being enclosed on both sides by burning fuel is decomposed in such a manner as to liberate free carbon and the carbon black is formed.

The temperatures may be of course carefully controlled by the manipulation of the supply of fuel and air but these may be regulated in accordance with the indications of a suitable thermocouple 24' which projects into the interior of the chamber 2 through the furnace wall.

The heating operation is carried out slowly until the thermocouple thermometer registers a desired stabilized temperature, generally somewhere between 1900° F. and 2300° F.

After the furnace has been brought up to the desired working temperature the adjustments for the production of carbon black are proceeded with. The usual procedure is that the gas and air supply nozzles are regulated along with the exhaust fan draught to obtain a predetermined setting to maintain furnace temperatures during carbon production, it being desirable to adjust the proportion of gas and air so that enough or slightly less air than required for combustion of the gas is maintained. When this adjustment of temperature regulation has been achieved the central sheet of hydrocarbon to be dissociated by the action of heat is projected through the central nozzle and the volume is gradually increased preferably concurrently with the building up of fan draught on the exit.

It will be understood that there will be a wide range of adjustment capable of the amount of air, combustible hydrocarbon and of the dissociation hydrocarbon, which, along with variation in draught pressures, may be regulated to meet the specific predetermined settings for continuous operation.

As has been described the outer furnace walls curve inwardly in spaced relation to the terminal vertical edges of the walls 7 between the combustion chamber and the flue passages 4 and the lip portions 9, which project inwardly past the inner walls, forming a discharge passage 10, narrower than the width of the main chamber 2. These lips intercept the outer strata of the material flowing longitudinally of the furnace chamber 2 and experience and practical experiments have shown that a large portion of the products of combustion of the outer strata are separated from the central stratum of material dissociated by the application of heat.

The two reactions of combustion and dissociation are carried out in adjacent planes with intermediate planes of mixed reaction. The proportions of gas allotted for combustion and dissociation may vary approximately from 40% to 60% or 60% to 40%, according to the type of carbon which it is desired to be produced. The hydrogen gas and carbon from dissociation flows through the central exit opening 10, which is preferably widened at the entrance 10' and these products flow into a suitable cooling chamber 24 in which the temperature is reduced to approximately 450° F. and from thence the carbon and its associated gases flow into a precipitating chamber 25 which may be of a suitable form using high tension electrical precipitation or agglomeration.

The discharge from the precipitator is carried through a conduit 26 under the influence of an exhaust fan 27 and it is then directed into a suitable type of separator 27', herein illustrated as a cyclone type and the carbon is discharged through the outlet 28 and gases through the top vent 28'.

Figure 9:
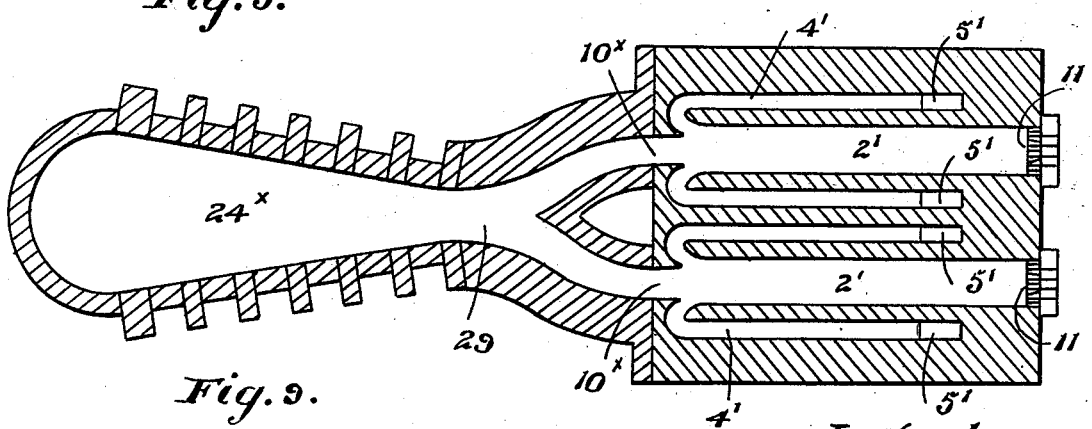
Figure 9 is a horizontal sectional view of a modified form of furnace and cooling chamber with a plurality of disassociation chambers therein.

The type of furnace illustrated and described in respect to Figures 1 to 5 contains a single reaction chamber with a horizontal flow of the hydrocarbons in vertical planes, but furnaces of large capacity may be constructed in multiple form, an example of which is illustrated in Figure 9 which shows a pair of combustion and dissociation chambers 2' parallely arranged each having double diversion passages 4' for the products of combustion leading to exit flues 5' which may be coupled in a suitable header controlled by a single exhaust fan. In this form the separate exits 10$^x$ are connected to passages leading to a common exit 29 which leads to the cooler 24$^x$ provided with a suitable discharge leading to a precipitator or an agglomerator, an exhaust fan and a separator.

The invention is herein shown and described as applied to a horizontal flow but it will be understood that furnaces may be constructed with the flow arranged vertically and the combustion and separating chambers may be of a rectangular flat type or they may be constructed in cylindrical form. In fact many cross sectional designs of furnace may be constructed within the scope of this invention so long as the principle is maintained of directing a flow of hydrocarbon to be dissociated by heat in a centralized area embraced by zones of combustion and having baffling means for diverting a flow of products of combustion from the flow of dissociated material and passages to conduct products of combustion in contact with areas of the furnace walls outside of the dissociation chamber to effect the heating of said walls with the discharging products of combustion and to effect the dissemination of radiant heat inwardly from said walls to the dissociation chamber.

In furnaces of the types herein described the heat of combustion is utiilzed most efficiently in maintaining a high temperature in the reaction zone and there will be less heat loss through absorption by the outer walls of the furnace and the radiant heat of the inner walls acts directly in maintaining a uniform combustion in the combustion zone, thereby augmenting the heat for endothermic reaction and ensuring a greater yield of carbon from the hydrocarbon directed through the central zone.

It is obvious that the flow of combustion gases intervening between the radiant solid walls of the furnace and the dissociation zone, protects the gases in their dissociation reaction from being detrimentally affected by contact with the solid radiant wall surfaces, a condition which is desirable for many classifications of carbon black.

What I claim as my invention is:

1. A method of making carbon black consisting in creating within a combustion chamber spaced streams of burning hydrocarbon, concurrently directing a stream of gaseous hydrocarbon centrally between and in contact with said burning streams directly toward a discharge passage and effecting dissociation of said centralized stream gaseous hydrocarbon to produce carbon black, and separating streams of burning hydrocarbon from the outward sides of the main flow of the dissociation products at the discharge end of the combustion chamber.

2. A method of making carbon black consisting in creating within a combustion chamber spaced streams of burning hydrocarbon, concurrently directing a flow of gaseous hydrocarbon between and in contact with said burning streams and effecting dissociation of said gaseous hydrocarbon to produce carbon black, dividing a portion of the outward streams of burning hydrocarbon from the central stream of dissociation products at the discharge end of the combustion chamber and directing the divided combustion products to form heated zones spaced from but substantially parallel with the burning hydrocarbon streams to minimize loss in the heat of combustion in dissociation of the gaseous hydrocarbon directed between the burning streams, and discharging the central stream of dissociation products from said combustion chamber.

3. A method of making carbon black consisting in creating within a combustion chamber substantially enveloping parallel burning streams of hydrocarbon of a degree of heat sufficient to effect decomposition of a gaseous hydrocarbon to form carbon black, directing a stream of such gaseous hydrocarbon centrally between and in contact with said burning streams directly toward and through a discharge orifice, separating products of combustion of the outward burning hydrocarbon streams from the enveloped stream of decomposed gaseous hydrocarbon at points adjacent to the discharge orifice, and discharging the combustion products separately from said combustion chamber.

4. A method of making carbon black consisting in directing streams of oxygen containing gaseous combustible substance adjacent to the inner sides of the boundary walls of a combustion chamber, igniting said combustible mixture to form primary heating zones, diverting the flow of said burning streams and directing same along the outer sides of the combustion chamber boundary walls to form secondary heat zones, controlling the velocity flow of said burning streams, directing a stream of hydrocarbon gas into said combustion chamber between and in contact with the burning streams and effecting decomposition of said gas and the formation of carbon black, and continuing the flow of the decomposed hydrocarbon past the point of diversion of the burning streams.

5. A method of making carbon black consisting in directing streams of air into a combustion chamber substantially parallel to the inner walls thereof, directing streams of a combustible gas angularly toward such walls and to mingle with said air streams to form a combustible mixture flowing along the walls, igniting the mixture, directing streams of hydrocarbon gas in a plane centrally between the said ignited streams directly toward a discharge passage and effecting decomposition of said gas by the heat of the burning strata either side thereof, and discharging the central strata of decomposed gas separately from the products of combustion of the outer combustible streams.

6. An apparatus for forming carbon black, comprising a furnace having its side walls formed with flue passages extending longitudinally thereof and communicating with one end of the combustion chamber, nozzle orifices arranged at the opposite end of said combustion chamber for directing streams of combustible gas longitudinally along the side walls within said chamber, means projecting inwardly from the side walls of the furnace for diverting products of combustion into the ends of said flue passages opening into said combustion chamber a discharge outlet from said combustion chamber spaced between said diverting means, and nozzle orifices at the end of the furnace opposite to said discharge outlet for directing a flow of hydrocarbon gas through said combustion chamber in contact with said streams of combustible gas.

7. An apparatus for forming carbon black comprising a furnace having a combustion chamber and a discharge opening arranged centrally of one end thereof of lesser width than the interior of said chamber, flue passages arranged within the walls of said furnace and opening to the combustion chamber on either side of said discharge opening and extending longitudinally within the side walls and away from said discharge opening, nozzle openings arranged at the end of the combustion chamber opposite to the discharge opening adapted to direct streams of combustible gas along the inner face of the side walls of said combustion chamber and toward the ends of the flue passages opening thereinto, and nozzle openings arranged between the aforesaid nozzle openings and directing a flow of hydrocarbon gas longitudinally of said combustion chamber toward said discharge opening and between said combustible streams.

8. An apparatus for forming carbon black comprising a furnace having longitudinal side walls and end walls enclosing a horizontal combustion chamber, a vertically disposed discharge passage of lesser width than said combustion chamber arranged centrally of one end of said furnace and leading from the combustion chamber, vertically disposed flue passages arranged within the longitudinal side walls of the furnace having ends curving inwardly and opening into the combustion chamber at either side of said discharge passage, a plurality of nozzle openings arranged at the end of the furnace opposite to the openings to said flue passages and adapted to direct streams of combustible gas along the inner faces of the side walls of the combustion chamber, and a plurality of nozzle openings adapted to direct streams of hydrocarbon gas through said combustion chamber toward said centrally arranged discharge opening and between the streams of combustible gas.

9. An apparatus as claimed in claim 6 including exhaust means arranged beyond said discharge outlet for inducing the flow of the products of decomposition, and exhaust means connected with said flue passages in the side walls of the furnace for inducting a regulated flow of products of combustion from said furnace.

10. An apparatus as claimed in claim 6, including a cooling chamber connected with said central discharge outlet, a precipitator receiving the cooled products from said cooling chamber, an exhaust fan connected with said precipitator, a separator beyond the exhaust fan to separate the carbon from the gases, and an exhaust fan connected with said flue passages in the furnace walls.

11. An apparatus for forming carbon black comprising a furnace having flat side walls, flue passages leading from one end of the furnace longitudinally through said side walls, a discharge outlet at one end of the furnace arranged between the entrance to said flue passages and adapted to discharge the decomposition products from the furnace, and bars arranged in the end of the furnace opposite said discharge, and flue passages each having a multiplicity of holes therethrough forming nozzle openings to direct gases into the furnace.

12. An apparatus for forming carbon black comprising a rectangular furnace having flue openings at either side of one end leading from the combustion chamber through the walls thereof, a discharge opening leading from said combustion chamber arranged midway between said flue openings to receive products of decomposition, vertically disposed bars arranged adjacent the side walls of said furnace and extending the height of the furnace at the end of the combustion chamber opposite said discharge opening and each having a multiplicity of nozzle openings therethrough in substantially parallel arrangement with the side walls of the furnace to direct a multiplicity of streams of air along the inner surface of said walls, vertically disposed bars arranged adjacent to the aforesaid bars and each having a multiplicity of nozzle openings therethrough directed outwardly toward the side walls of the furnace to direct streams of gas to mingle with said air streams, a vertical bar arranged midway between the aforesaid paired bars and having a multiplicity of nozzle openings therethrough directed toward the central discharge opening at the opposite end of the furnace, conduits connected with said central and adjacent nozzle bars to direct a supply of gaseous material through the nozzle openings therein, and conduits connected with the outer nozzle bars for directing a supply of air to the nozzle openings therein.

PERCIVAL H. MITCHELL.